United States Patent
Lee et al.

(10) Patent No.: US 9,446,376 B2
(45) Date of Patent: Sep. 20, 2016

(54) APPARATUS FOR PYROLYSIS USING MOLTEN METAL

(71) Applicant: KOREA INSTITUTE OF INDUSTRIAL TECHNOLOGY, Chungcheongnam-do (KR)

(72) Inventors: Uen Do Lee, Daejeon (KR); Won Yang, Gyeonggi-do (KR); Dong Ho Park, Gyeonggi-do (KR); Ji Hong Moon, Gwangju (KR); Chang Won Yang, Incheon (KR)

(73) Assignee: Korea Institute of Industrial Technology, Chungcheongnam-Do (KR)

( * ) Notice: Subject to any disclaimer, the term of this patent is extended or adjusted under 35 U.S.C. 154(b) by 124 days.

(21) Appl. No.: 14/366,004

(22) PCT Filed: Nov. 9, 2012

(86) PCT No.: PCT/KR2012/009465
§ 371 (c)(1),
(2) Date: Jun. 17, 2014

(87) PCT Pub. No.: WO2013/094879
PCT Pub. Date: Jun. 27, 2013

(65) Prior Publication Data
US 2015/0151274 A1  Jun. 4, 2015

(30) Foreign Application Priority Data
Dec. 20, 2011  (KR) .................. 10 2011 0138685

(51) Int. Cl.
*B01J 8/18*  (2006.01)
*B01J 19/26*  (2006.01)
(Continued)

(52) U.S. Cl.
CPC .............. *B01J 19/26* (2013.01); *B01J 19/0006* (2013.01); *C10B 49/14* (2013.01); *C10B 53/00* (2013.01);
(Continued)

(58) Field of Classification Search
CPC ............ B01J 8/18; B01J 19/26; B01J 19/00; B01J 19/0006; B01J 2219/00164; B01J 2219/00119; C10G 1/02
USPC ................. 422/139, 141, 142, 187, 198, 643
See application file for complete search history.

(56) References Cited

U.S. PATENT DOCUMENTS 2,730,488 A * 1/1956 De Rosset et al. ............ 208/125
3,729,297 A * 4/1973 Fujio et al. ......................... 48/92
(Continued)

FOREIGN PATENT DOCUMENTS

| JP | 2003035408 A | 2/2003 |
| KR | 100303473 B1 | 7/2001 |

(Continued)

*Primary Examiner* — Huy-Tram Nguyen
(74) *Attorney, Agent, or Firm* — McNees Wallace & Nurick LLC

(57) ABSTRACT

An embodiment of the present invention is directed to a pyrolysis device including a reactor in which an injected raw material and a melted liquid metal are present together, a circulating pump connected to the reactor, a buffer tank disposed on an upper portion of the reactor and receiving the liquid metal from the circulating pump, a nozzle coupled with the buffer tank and jetting the liquid metal within the buffer tank into the reactor, a separating apparatus separating pyrolyzed char and slag, and a combustion furnace connected to the reactor to combust the fuel supplied from the reactor and supply heat to the reactor, thereby reacting the liquid metal sprays jetted from the nozzle with gases generated in the reactor to purify the gases.

8 Claims, 2 Drawing Sheets

(51) Int. Cl.

| | |
|---|---|
| C10B 53/00 | (2006.01) |
| F23G 5/027 | (2006.01) |
| C10B 49/14 | (2006.01) |
| C10B 53/02 | (2006.01) |
| C10B 53/07 | (2006.01) |
| C10G 9/34 | (2006.01) |
| B01J 19/00 | (2006.01) |
| C10G 1/02 | (2006.01) |
| C10G 1/10 | (2006.01) |

(52) U.S. Cl.
CPC ............... *C10B 53/02* (2013.01); *C10B 53/07* (2013.01); *C10G 1/02* (2013.01); *C10G 1/10* (2013.01); *C10G 9/34* (2013.01); *F23G 5/027* (2013.01); *B01J 2219/00119* (2013.01); *B01J 2219/00164* (2013.01); *C10G 2300/1003* (2013.01); *Y02E 50/14* (2013.01); *Y02P 20/143* (2015.11)

(56) References Cited

U.S. PATENT DOCUMENTS 4,743,341 A * 5/1988 Hladun ........................ 202/99
7,390,337 B2 * 6/2008 Miyoshi et al. ............. 48/127.9

FOREIGN PATENT DOCUMENTS

| KR | 100305113 B1 | 7/2001 |
|---|---|---|
| KR | 100354920 B1 | 9/2002 |
| KR | 1020040081958 | 9/2004 |

* cited by examiner

APPARATUS FOR PYROLYSIS USING MOLTEN METAL

TECHNICAL FIELD

The present invention relates to a pyrolysis device using liquid metal, and more particularly, to a pyrolysis device capable of extracting gas of a volatile component and pyrolysis oil by pyrolyzing fuel of biomass, coal, waste plastic, and the like using a liquid metal.

BACKGROUND ART

With the progress of industrialization, the amount of domestic waste and various kinds of industrial waste has continuously increased. In particular, a considerable amount of disposable products are used and thus the amount of waste thereof has increased day by day. Further, the market demand has greatly increased for new sources of renewable energy which can replace fossil fuel, which has a difficulty in supply due to depletion. To this end, interest in the production of clean energy by way of pyrolysis gasification of biomass or waste has increased.

Examples of a method of treating waste and biomass according to the related art may include a method of supplying oxygen to an incinerator and incinerating waste at a high temperature of 900° C. or more using a direct firing method. However, when the waste includes rubber, textiles, and plastic products and is treated by the above-mentioned incineration method, various pollutants such as fumes and bad smells may be generated in large quantities and incinerator ash remaining after the waste is incinerated may have residual pollutants. Further, when the waste and the biomass are simply treated by incineration, only heat which is generated by combustion may be used and thus it is difficult to create a higher added value.

Recently, to obtain products having a higher added value using the waste and the biomass, a technology of obtaining pyrolysis oil and synthesis gas by pyrolyzing components other than carbon by heating the waste and the biomass in an anaerobic state has been proposed.

Meanwhile, Korean Patent No. 0354920 discloses a pyrolysis treating apparatus including: a pyrolysis furnace which pyrolyzing waste; a mixing furnace which mixes the pyrolyzed waste with air; a known combustion furnace which incinerates the pyrolyzed waste mixed with the air; a known dust collector which collects dust of the incinerated pyrolyzed waste; a cleaner which cleans the dust collected gas; primary and secondary neutralizers which neutralize harmful gas passing through the cleaner, and a drier which dries the neutralized gas sucked into a blower using a heater.

However, since the method of pyrolyzing and treating waste as described in the above Cited Document performs the pyrolysis process once, subsequently causes the pyrolysis furnace to be in a vacuum state without oxygen, and removes carbonized ash within the pyrolysis furnace, a process of injecting, melting, and gasifying waste into the pyrolysis furnace may not be continuously performed and after the process of injecting and melting waste is performed once, the pyrolysis furnace must be cooled and then the above-mentioned process needs to be repeated again.

Further, in the pyrolysis furnace according to the related art as described above, a separate quenching means or a heat insulating means is insufficient, such that heat efficiency may be reduced and a lot of time for heating and cooling may be required. Further, even though the pyrolysis furnace includes the dust collector, the dust collector does not perform perfect deodorization and thus the finally discharged gas still may include a harmful bad smell.

On the other hand, various kinds of harmful components including acid gas are included in gases which are generated by the pyrolysis. When pollutants and the like in gases are discharged as they are, along with the gases, the quality of extracted gases is degraded. Therefore, a gas treating apparatus which may treat the pollutants is required.

On the other hand, to produce pyrolysis oil from the biomass and the waste, it is important to create fast pyrolysis conditions based on a fast heat transfer under an anaerobic atmosphere at about 600 to 700° C. Further, a yield of oil increases as the retention time of the produced pyrolysis gas within the reactor decreases. It has been reported that in the existing apparatus, a fluidized-bed fast pyrolysis reactor using fluid sand having a high heat transfer and the like shows excellent characteristics; however, an additional gas supply required for fluidization is essential and therefore it is difficult to create vacuum conditions that reduce the retention time within the reactor and incidental facilities are required for treating dust and acid gas which occurs during the attrition of fluid sand and the pyrolysis of a raw material respectively.

DISCLOSURE

Technical Problem

An aspect of the present invention provides a pyrolysis device including a reactor in which an injected raw material and a melted liquid metal are present together, a circulating pump connected to the reactor, a buffer tank disposed on an upper portion of the reactor and receiving the liquid metal from the circulating pump, a nozzle coupled with the buffer tank and jetting the liquid metal within the buffer tank into the reactor, a separating apparatus separating pyrolyzed char and slag, and a combustion furnace connected to the reactor to combust the fuel supplied from the reactor and supply heat to the reactor, thereby effectively transferring heat to the injected raw material and removing impurities such as acid gas and dust included in pyrolyzed and discharged gases.

Another aspect of the present invention provides a pyrolysis device capable of preventing impurities such as ash and unburned matter from being mixed and preventing the liquid metal from being oxidized, unlike the case in which the liquid metal can be contaminated or oxidized during the direct combustion of fuel within the liquid metal reactor, heated by an indirect heat exchange using a heat exchanger.

Still another aspect of the present invention provides a pyrolysis device with negligible loss of a liquid metal during an operation due to the low vapor pressure of a liquid metal and capable of easily keeping the inside of a reactor in a vacuum state, thereby increasing convenience of operation and maximizing the production yield of pyrolysis oil.

Still yet another aspect of the present invention provides a pyrolysis device for separating and removing impurities included in a raw material based on a specific gravity difference between liquid metal and the impurities to facilitate maintenance and management.

Technical Solution

According to one aspect of the present invention, there is provided a pyrolysis device using a liquid metal, including: a reactor in which the liquid metal is received; a circulating pump connected to the reactor; a buffer tank disposed on an upper portion of the reactor and receiving the liquid metal from the circulating pump; a nozzle coupled with the buffer tank and jetting the liquid metal within the buffer tank into the reactor; and a combustion furnace combusting char generated in the reactor to supply heat to the reactor, wherein liquid metal sprays jetted from the nozzle react with gases generated in the reactor to purify the gases.

The pyrolysis device may further include: a slag outlet connected to the reactor, wherein the slag melted in the liquid metal within the reactor is discharged to the outside of the reactor through the slag outlet.

The liquid metal may be selected from a group consisting of Sn, Bi, and a mixture of Sn and Bi.

The pyrolysis device may further include: a control unit connected to the circulating pump, the combustion furnace, and the slag outlet, wherein the control unit controls at least one of a pumping speed of the circulating pump, a combustion amount of the combustion furnace, and a discharge amount of the slag from the slag outlet.

The pump may include a filter which removes impurities within the liquid metal introduced from the reactor.

The heat generated in the combustion furnace may keep the temperature of the pyrolysis reactor using an indirect heat exchange apparatus such as a heat pipe.

The liquid metal moving in the pump passes through the combustion furnace to perform the additional heat exchange.

The gases generated in the reactor which are synthesis gas including dust and sulfur compound may be configured to smoothly remove impurities of products by the liquid metal jetted from the nozzle.

The raw material introduced into the reactor may comprise at least any one selected from a group consisting of biomass, coal, waste plastic, and waste PCB.

The nozzle may be removably coupled with the buffer tank and may be selectively coupled with the buffer tank depending on a size of a jetting hole of the nozzle.

The reactor may further include a blower to maximize the yield of pyrolysis oil to keep an inside of the reactor in a vacuum state, thereby minimizing the retention time of the pyrolysis products in the reactor.

Advantageous Effects

According to the embodiments of the present invention, the heat may be effectively delivered to the injected raw material and impurities such as acid gas and dust which are included in the pyrolyzed and discharged gas may be removed, thereby obtaining a high quality of pyrolyzed gas.

Further, unlike the related art of directly combusting fuel within the liquid metal, according to the embodiment of the present invention, the liquid metal may be heated by the indirect heat exchange using the heat exchanger, thereby preventing impurities such as ash and unburned matter from being mixed and prevent the liquid metal from being oxidized.

Further, the impurities included in a raw material may be separated and removed due to the difference in specific gravity between the liquid metal and the impurities, thereby facilitating maintenance and management.

Further, according to the embodiment of the present invention, the liquid metal may be melted within the intended operation range to keep the liquid state and may have the high boiling point to prevent loss due to evaporation.

Further, according to the embodiment of the present invention, the liquid metal may have a heat capacity higher than that of the air and water that are mainly used in the existing heat exchange methods and therefore have a high amount of heat movement to thereby increase the efficiency of the heat exchange and may have a low viscosity to increase the convenience of movement.

Further, the loss of the liquid metal may be reduced during the operation due to the low vapor pressure of the liquid metal and the inside of the reactor may be kept in a vacuum state, thereby increasing the convenience of operation and maximizing the production yield of pyrolysis oil.

MODE FOR INVENTION

Components forming a pyrolysis device 100 according to an embodiment of the present invention may be integrally formed or separately formed, if necessary. Further, some of the components may be omitted according to the intended use.

Figure 1:
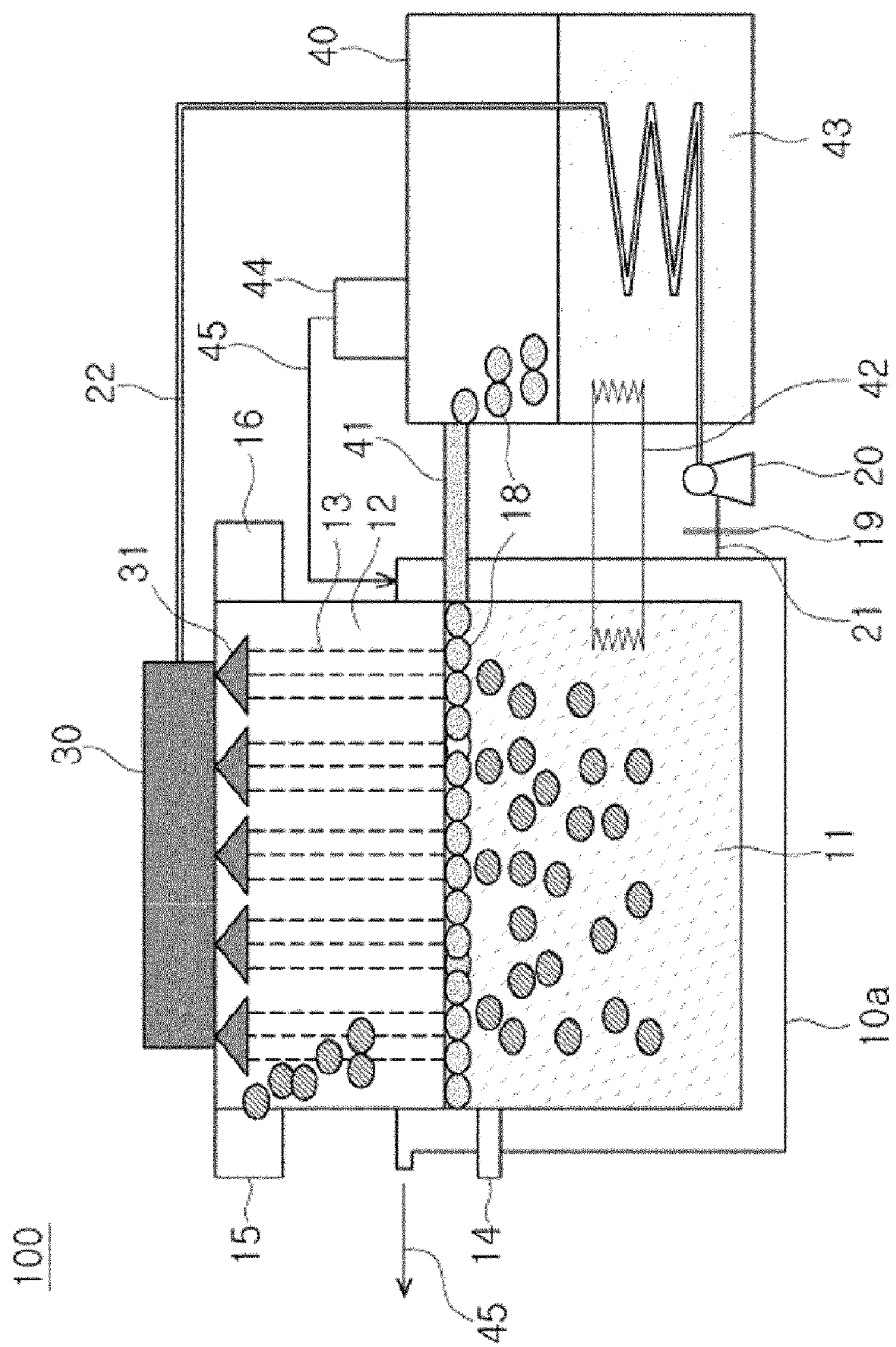
FIG. 1 is a conceptual diagram of a pyrolysis device according to an embodiment of the present invention.
Figure 2:
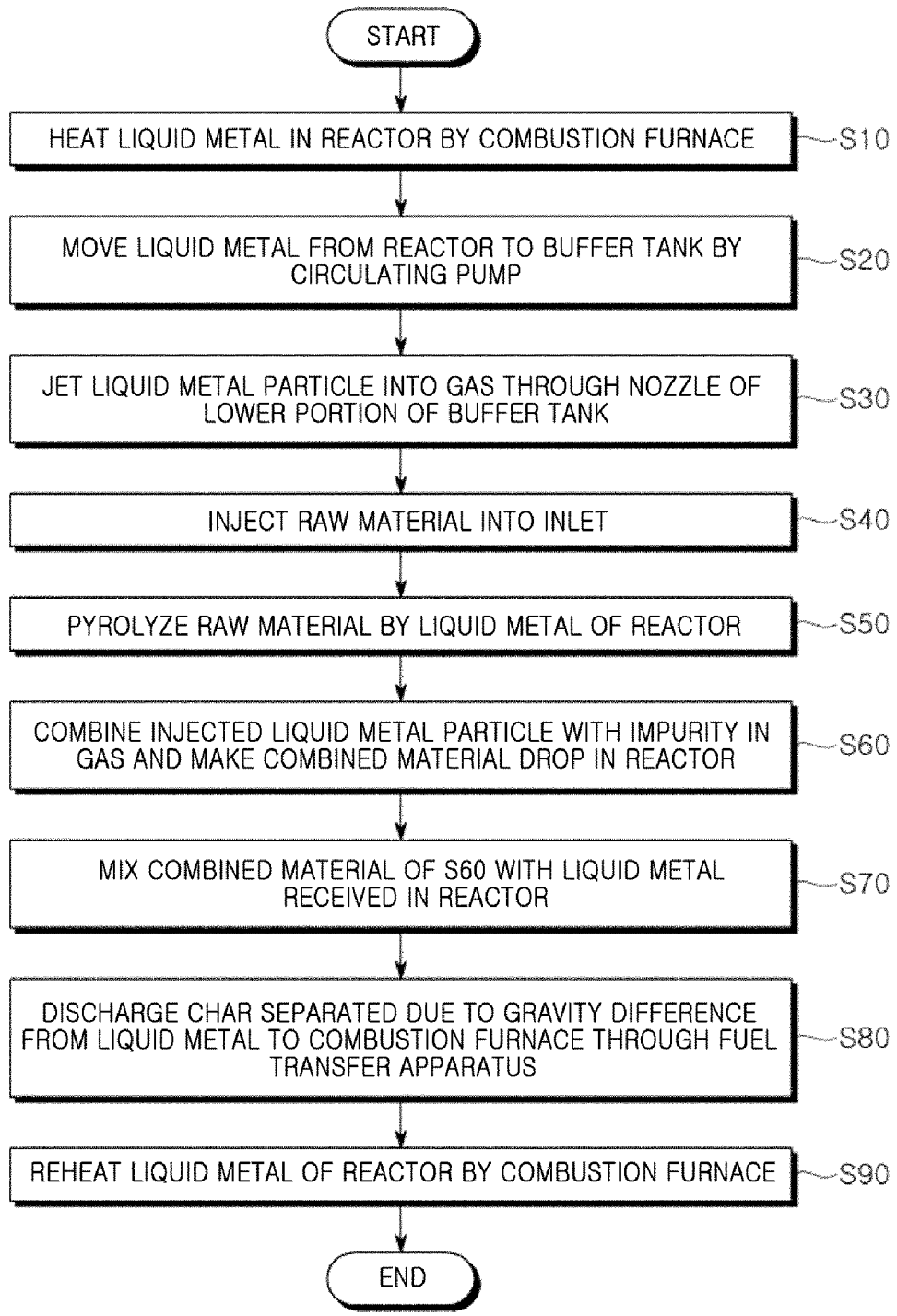
FIG. 2 is a flow chart of a process of operating a pyrolysis device according to an embodiment of the present invention.

An exemplary embodiment of the pyrolysis device 100 according to the present invention will be described with reference to FIGS. 1 and 2. During the process, thickness of lines, size of components, or the like, illustrated in the drawings may be exaggerated for clearness and convenience of explanation. Further, the following terminologies are defined in consideration of the functions in the present invention and may be construed in different ways by the intention or practice of users and operators. Therefore, the definitions of terms used in the present description should be construed based on contents throughout the specification.

Configuration Description of Pyrolysis Device 100 According to the Invention Hereinafter, a configuration of the pyrolysis device 100 according to the embodiment of the present invention will be described with reference to FIG. 1.

The pyrolysis apparatus 100 according to the embodiment of the present invention includes a reactor 10 disposed on a lower portion of a liquid metal 11 and having a gas 12 disposed at an upper portion thereof; a circulating pump 20 connected to a lower portion of the reactor 10 to circulate the liquid metal 11, a buffer tank 30 connected to the circulating pump 20 and disposed on an upper surface of the reactor 10; a plurality of nozzles 31 coupled with a lower surface of the buffer tank 30 and having a plurality of jetting holes which jet the liquid metal 11 within the buffer tank 30 into the reactor 10; and a combustion furnace 40 connected to the lower portion of the reactor 10 to combust the fuel supplied from the reactor 10.

The reactor 10 is a place in which the liquid metal 11 in a molten state and gases 12 to be purified are located. In the reactor 10, the liquid metal 11 is kept in the molten state by indirectly exchanging heat generated in the combustion furnace 40 using a heat exchanger 42 and exchanging heat obtained during a process of a high temperature combustion gas 45 to an outer wall 10*a* of the reactor 10 and the low temperature liquid metal 11 after the pyrolysis reaction moves through a liquid metal filter 19 and the circulating pump 20 and is reheated by passing through the combustion furnace 40 and then is jetted through the buffer tank 30 and the nozzle 31 to purify and heat the gas 12 introduced into the reactor 10. The liquid metal 11 and the gases 12 within the reactor 10 are separated into top and bottom portions due to a specific gravity difference. In detail, the liquid metal 11 is located at a lower portion of the reactor 10 and the gases 12 are located at an upper portion of the reactor 10. Here, the outer wall 10a of the reactor 10 serves as a heat exchanger and a jacket which may recover heat from combustion gas.

The reactor 10 includes a plurality of inlets 15 into which a raw material 17 is injected and an outlet 16 through which the gases 12 are discharged. The raw material 17 is injected into the liquid metal 11 of the lower portion of the reactor 10 through the inlet 15. An example of the raw material 17 injected into the reactor 10 may include biomass, coal, waste plastic, waste PCB, and the like.

The injected raw material 17 is pyrolyzed by the liquid metal 11 and is separated into the gases 12, char 18, and other impurities due to the specific gravity difference from the liquid metal 11. The gases 12 are made of volatile components and are the object of extraction of the present invention. The char 18 is transferred to the combustion furnace 40 through a fuel transfer apparatus 41 and is combusted by the combustion furnace 40 to be used as fuel supplying heat to a reacting unit. Other impurities are discharged to a slag output 14, along with slag.

As the result of pyrolyzing the raw material 17, the gases 12 generated at the upper portion of the reactor 10 may be purified through the liquid metal sprays 13 jetted from the nozzle 31 and may be discharged to the outside. The buffer tank 30 and the nozzle 31 are disposed at the upper end of the reactor 10 and the nozzle 31 jets the liquid metal sprays 13 into the gases 12. Impurities such as acid gas, dust, and the like which are included in the gases 12 are melted in the liquid metal sprays 13 jetted into the gases 12. The jetted liquid metal sprays 13 and the impurities drop into the reactor 10 in the coupled state and are mixed with the liquid metal 11 which is located at the lower portion of the reactor 10. That is, the liquid metal sprays 13 are jetted into the gases 12 and reduce the impurities of gas 12, which are coupled and discharged with the acid gas, dust, and the like which are also included in the gases 12.

In the reactor 10, the fuel transfer apparatus 41 supplying the char 18 is included in the combustion furnace 40. The char 18 generated according to the result obtained by pyrolyzing the raw material 17 floats on the surface of the liquid metal 11 due to the specific gravity difference from the liquid metal 11. Therefore, the fuel transfer apparatus 41 is disposed in the vicinity of the surface of the liquid metal 11 to selectively discharge the char 18 to the combustion furnace 40.

The reactor 10 may further include the slag outlet 14 through which slag may be discharged to the outside. The raw material 17 is pyrolyzed in the reactor 10 and thus the slag which is an impurity melted in the liquid metal 11 floats on the surface of the liquid metal 11 due to the specific gravity difference from the liquid metal 11 in the reactor 10. However, the slag has the specific gravity higher than that of the char 18 and therefore is formed on a lower layer of the char 18. Therefore, the slag outlet 14 is disposed to be lower than the height of the liquid metal 11 formed by the fuel transfer apparatus 41 to be able to selectively discharge the slag to the outside.

The heat exchanger 42 supplied with heat generated in the combustion furnace 40 from the reactor 10 is disposed at the lower portion of the reactor 10. The heat exchanger 42 exchanges heat from the reactor 10 with the combustion furnace 40 to transfer the heat generated by combusting the char 18 in the combustion furnace 40 to the reactor furnace 10.

The reactor 10 may further include a blower (not illustrated). Only the liquid metal 11, the raw material 17, and products are present within the reactor 10, and therefore the reactor 10 may be kept in a vacuum state by controlling the blower. In this case, it is possible to increase an output of the polymeric hydrocarbon gas 12 which assists the fast pyrolysis and may be made in an oil form among the volatile components by a general condensation process.

The circulating pump 20 is connected to the reactor 10 and the buffer tank 30 to circulate the liquid metal 11 in the pyrolysis device 100. The circulating pump 20 may be connected to the lower portion of the reactor 10 to circulate the liquid metal 11 in which a small amount of slag is included. That is, the slag having a small specific gravity floats within the reactor 10 and thus the amount of impurities is relatively small in the lower layer of the liquid metal 11.

Further, the circulating pump 20 may further include a liquid metal filter 19 which allows impurities to be removed. Even though the slag outlet 14 removes impurities from the liquid metal 11, since the impurities which are not separated may be melted in the liquid metal 11, the filter may be added to the pump or an appropriate circulating channel to remove the impurities.

The buffer tank 30 is connected to the circulating pump 20 to jet the liquid metal 11 moving from the circulating pump 20 between the gases 12 which are disposed on the upper portion of the reactor 10 through the nozzle 31. The nozzle 31 can be detached from the buffer tank 30. Therefore, the nozzle 31 may be selectively coupled with the buffer tank 30 depending on the jetting holes of the nozzle 31.

Further, the buffer tank 30 may store some of the liquid metal 11 to be jetted and even though the circulating amount of the liquid metal 11 is instantly changed depending on the operation of the circulating pump 20 and the filter, the amount jetted from the nozzle 31 to the liquid metal 11 may be maintained constant.

As described above, the nozzle 31 is coupled with the lower surface of the buffer tank 30 to jet the liquid metal 11 moving from the buffer tank 30 into the reactor 10. A plurality of nozzles 31 may be disposed at the lower end of the buffer tank 30 in a line and the jetting holes formed in the nozzle 31 are formed radially and the liquid metal sprays 13 may be minutely jetted between the gases 12 which are located at the upper portion of the reactor 10.

The discharged pyrolyzed gas 12 is discharged by passing through the jetted liquid metal sprays 13 and therefore the dust and sulfurization-based gas 12 is removed, such that a high quality of nature may be kept.

The combustion furnace 40 is connected to the reactor 10 to keep the liquid metal 11 in the molten state. The combustion furnace 40 obtains the char 18 generated by separating the raw material 17 injected into the pyrolysis device 100 from the reactor 10 through the fuel transfer apparatus 41.

An air inlet 43 is disposed at the lower portion of the combustion furnace 40 to supply oxygen to the combustion furnace 40 so as to combust the char 18 and an air outlet 44 is disposed at the upper portion of the combustion furnace 40 to discharge the combusted air. The discharged combustion gas 45 transfers heat to the reactor 10 via a heat exchanger 46 for recovering heat of the combustion gas to additionally supply heat to the reactor 10 and then is discharged to the outside.

The combustion furnace 40 may be configured as a fluidized-bed system to control the combustion amount and combustion speed so as to maintain a temperature of the reactor 10. Further, the combustion furnace 40 is connected to the reactor 10 by the heat exchanger 42 to be able to selectively exchange only heat.

As such, the pyrolysis device 100 according to the embodiment of the present invention heats the liquid metal 11 by indirect heat exchange using the heat exchanger 42 to prevent impurities such as ash and unburned matter from being mixed and prevent the liquid metal from being oxidized, as compared with the case in which the char 18 is directly combusted in the liquid metal 11.

Further, the pyrolysis device 100 may further include a control unit (not illustrated). The control unit controls the pumping speed of the circulating pump 20 to be able to control the circulating speed and circulation amount of the liquid metal 11 in the pyrolysis device 100 and controls the combustion furnace 40 to be able to control the temperature of the liquid metal 11 within the reactor 10, such that the melted degree and viscosity of the liquid metal 11 may be controlled. Further, the control unit controls the slag outlet 14 to be able to control an amount of slag which is discharged from the reactor 10.

According to the embodiment of the present invention, the liquid metal 11 circulating heat has a heat capacity larger than that of air and water which are mainly used in the exiting heat exchange methods and thus has a high amount of heat movement when an appropriate process design is involved, such that the liquid metal 11 is effective in the heat exchange, and the liquid metal 11 has a lower viscosity than that of another liquid metal 11 and thus is convenient in movement, such that the liquid metal is appropriate for the process.

Further, according to the embodiment of the present invention, the liquid metal 11 circulating heat has a large specific gravity difference from various impurities (ash, unburned fuel, moisture) which may occur when the liquid metal 11 directly contacts the gases 12 and therefore is effective for separation due to the filter and the specific gravity difference.

Further, according to the embodiment of the present invention, the liquid metal 11 circulating heat may be formed by melting any one of tin (Sn), bismuth (Bi), or a mixture of the tin (Sn) and the bismuth (Bi). The liquid metal 11 made of tin (Sn), bismuth (Bi), or a mixture of the tin (Sn) and the bismuth (Bi) is melted depending on the operation of the pyrolysis device 100 according to the embodiment of the present invention to keep a liquid state and has a high boiling point to have no loss due to evaporation during the operation of the pyrolysis device 100 according to the embodiment of the present invention.

Further, the liquid metal 11 made of the above-mentioned metals has a heat capacity larger than that of gas and steam which are used in the existing pyrolysis method to be able to supply a large calorie in a relatively smaller amount than the raw material 17 and the corresponding liquid metal 11 has a larger specific gravity but a lower viscosity than that of the raw material 17 and thus is effectively infiltrated into the supplied raw material 17 to be able to perform the pyrolysis.

Operation Method Of Pyrolysis Device 100 According To The Invention

Hereinafter, a process of pyrolyzing the raw material and reusing the char 18 with the pyrolysis device 100 according to the embodiment of the present invention will be described with reference to FIGS. 1 and 2.

First, heating the liquid metal 11 of the reactor 10 by the combustion furnace 40 is performed (S10). The combustion furnace 40 combusts the char 18 included therein to supply heat to the reactor 10 through the heat exchanger 42. The liquid metal 11 is heated by the combustion furnace and is melted at a constant temperature and has a viscosity which easily moves through the circulating pump 20.

Next, the liquid metal 11 moves from the reactor 10 to the buffer tank 30 by the circulating pump 20 (S20). The melted liquid metal 11 is directly connected to the reactor 10 or moves to the circulating pump 20 which is connected through the intake pipe 21, and the like. The filter 19 is disposed in the circulation pump 20 to be able to remove the impurities included in the liquid metal 11. The circulating pump 20 moves the liquid metal 11 to the buffer tank 30 through the discharge tube 22, and the like.

Next, the nozzle 31 which is disposed at the lower portion of the buffer tank 30 jets the liquid metal 11 into the reactor (S30). The buffer tank 30 temporarily receives the liquid metal 11 moving from the circulating pump 20 to be able to constantly keep the amount of liquid metal 11 which is jetted between the gases 12 through the nozzle 31. The liquid metal 11 moving to the buffer tank 30 starts to be jetted into the reactor 10 through the nozzle 31 in a form of the liquid metal sprays 13.

Next, injecting the raw material 17 into the inlet 15 is performed (S40). The raw material 17 includes a material to be pyrolyzed and fuel.

Next, the injected raw material 17 is injected into the liquid metal 11 of the reactor 10, the raw material 17 injected by the heat of the liquid metal 11 is pyrolyzed, and the pyrolyzed raw material 17 is separated from the gases 12, the char 18, and other impurities (S50).

The slag, which is other impurities generated according to the result of pyrolyzing the raw material 17 injected into the reactor 10 by the liquid metal 11, rises to the surface of the liquid metal 11 due to the specific gravity difference and is separated from the char 18 and the liquid metal 11 and the separated slag is discharged to the outside through the slag outlet 14.

Next, the jetted liquid metal sprays 13 are coupled with impurities in the gases 12 and thus drop in the reactor 10 (S60). The gases 12 from the injected raw material 17 are discharged to the outlet 16 through the upper portion of the reactor 10, the liquid metal sprays 13 jetted into the reactor 10 penetrate between the discharged gases 12, and the impurities included in the gases are melted to purify the gases 12.

Next, mixing the jetted liquid metal sprays 13 combined with the impurities in the gases 12 with the liquid metal 11 received in the reactor 10 is performed (S70). The liquid metal sprays 13 move to the lower portion of the reactor 10 and thus are mixed with the liquid metal 11 which is located at the lower portion of the reactor 10 in the molten state and the mixed liquid metal 11 is kept in a molten state by the combustion furnace 10.

Next, discharging the char 18 separated due to the specific gravity difference between the liquid metal 11 and the impurities to the combustion furnace 40 through the fuel transfer apparatus 41 is performed (S80). The char 18 decomposed according to the result obtained by pyrolyzing the raw material 17 injected into the reactor 10 by the liquid metal 11 rises to the surface of the liquid metal 11 due to the specific gravity difference from the liquid metal 11, to thereby be separated from the liquid metal 11, and the separated char 18 is discharged into the combustion furnace 40 through the fuel transfer apparatus 41.

Finally, reheating the liquid metal 11 of the reactor 10 by the combustion furnace 40 is performed (S90). The char 18 transferred to the combustion furnace 40 is used as the fuel of the combustion furnace 40. Therefore, heat may be supplied from the combustion furnace 40 to the reactor 10 without the need for a separate fuel source for the combustion furnace 40. Further, the liquid metal 11 is reheated through the transfer path which is present in the combustion furnace 40 and then is transferred to the nozzle 31.

The operation of the pyrolysis device 100 as described above may be controlled by the control unit (not illustrated). The control unit controls the pumping speed of the circulating pump 20, the melting temperature of the liquid metal 11, the amount of slag discharged from the slag outlet 14, and the like to control the overall operation of the pyrolysis device 100 according to the embodiment of the present invention.

According to the embodiment of the present invention, the process is repeatedly performed, and thus the liquid metal 11 is jetted into the gases 12 using the nozzle 31, such that the heat exchange may be easier and the duration may be longer than those of the existing pyrolysis device 100, thereby increasing the yield of the pyrolyzed gases 12.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

The invention claimed is:

1. A pyrolysis device using a liquid metal, comprising:
a reactor in which the liquid metal is received;
a circulating pump connected to the reactor;
a buffer tank disposed on an upper portion of the reactor and receiving the liquid metal from the circulating pump;
a nozzle coupled with the buffer tank and jetting the liquid metal within the buffer tank into the reactor; and
a combustion furnace combusting char generated in the reactor to supply heat to the reactor,
wherein liquid metal sprays jetted from the nozzle react with gases generated in the reactor to purify the gases,
wherein the pump includes a filter which removes impurities within the liquid metal introduced from the reactor.

2. The pyrolysis device of claim 1, further comprising:
a slag outlet connected to the reactor, wherein the slag melted in the liquid metal within the reactor is discharged to the outside of the reactor through the slag outlet.

3. The pyrolysis device of claim 1, wherein the liquid metal is selected from a group consisting of Sn, Bi, and a mixture of Sn and Bi.

4. The pyrolysis device of claim 2, further comprising:
a control unit connected to the circulating pump, the combustion furnace, and the slag outlet connected to the reactor, wherein the control unit controls at least one of the pumping speed of the circulating pump, the combustion amount of the combustion furnace, and the discharge amount of the slag from the slag outlet.

5. The pyrolysis device of claim 1, wherein the gas generated in the reactor is exhaust gas of a hydrocarbon component including a sulfur compound.

6. The pyrolysis device of claim 1, wherein a raw material introduced into the reactor comprises at least any one selected from a group consisting of biomass, coal, waste plastic, and waste PCB.

7. A pyrolysis device using a liquid metal, comprising:
a reactor in which the liquid metal is received;
a circulating pump connected to the reactor;
a buffer tank disposed on an upper portion of the reactor and receiving the liquid metal from the circulating pump;
a nozzle coupled with the buffer tank and jetting the liquid metal within the buffer tank into the reactor; and
a combustion furnace combusting char generated in the reactor to supply heat to the reactor,
wherein liquid metal sprays jetted from the nozzle react with gases generated in the reactor to purify the gases,
wherein the nozzle is removably coupled with the buffer tank and is selectively coupled with the buffer tank depending on a size of a jetting hole of the nozzle.

8. A pyrolysis device using a liquid metal, comprising:
a reactor in which the liquid metal is received;
a circulating pump connected to the reactor;
a buffer tank disposed on an upper portion of the reactor and receiving the liquid metal from the circulating pump;
a nozzle coupled with the buffer tank and jetting the liquid metal within the buffer tank into the reactor; and
a combustion furnace combusting char generated in the reactor to supply heat to the reactor,
wherein liquid metal sprays jetted from the nozzle react with gases generated in the reactor to purify the gases,
wherein the reactor further includes a blower to keep an inside of the reactor in a vacuum state.

* * * * *